(12) United States Patent
Boissonnat et al.

(10) Patent No.: US 8,627,686 B2
(45) Date of Patent: *Jan. 14, 2014

(54) AUTOMATIC STRAND TAKE-UP INSTALLATION

(75) Inventors: Philippe Boissonnat, Challes les Eaux (FR); Jean-Paul Boisset, Barby (FR); Jean-Pierre Karbowski, Chambery (FR); Danyele Rey, legal representative, Chambery (FR); Natacha Karbowski, legal representative, Crest (FR); Marie Karbowski, legal representative, Hyeres (FR); Sarah Karbowski, legal representative, Saint-Alban-Leysse (FR); Lydia Karbowski, legal representative, Saint-Alban-Leysse (FR); Frederic Skura, Drumettaz Clarafond (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 1046 days.

This patent is subject to a terminal disclaimer.

(21) Appl. No.: 11/996,336

(22) PCT Filed: Jul. 20, 2006

(86) PCT No.: PCT/FR2006/050728
§ 371 (c)(1),
(2), (4) Date: Oct. 27, 2008

(87) PCT Pub. No.: WO2007/010168
PCT Pub. Date: Jan. 25, 2007

(65) Prior Publication Data
US 2009/0193852 A1     Aug. 6, 2009

(30) Foreign Application Priority Data
Jul. 22, 2005 (FR) ..................................... 05 52272

(51) Int. Cl.
*C03B 37/08* (2006.01)

(52) U.S. Cl.
USPC .................. 65/479; 65/471; 65/480; 65/535; 65/539

(58) Field of Classification Search
USPC ............................ 65/471, 479, 480, 535, 539
See application file for complete search history.

(56) References Cited

U.S. PATENT DOCUMENTS

| | | | |
|---|---|---|---|
| 3,128,028 A * | 4/1964 | Crafford | ........................ 226/151 |
| 3,279,709 A | 10/1966 | Carlson et al. | |
| 3,293,013 A | 12/1966 | Drummond | |
| 3,644,109 A | 2/1972 | Klink et al. | |
| 3,681,039 A | 8/1972 | Marzocchi | |

(Continued)

FOREIGN PATENT DOCUMENTS

| | | |
|---|---|---|
| CH | 284044 | 7/1952 |
| EP | 48658 | 3/1982 |

(Continued)

OTHER PUBLICATIONS

Office action from Chinese Application No. 200680026847.0 dated Dec. 8, 2010.

(Continued)

*Primary Examiner* — Queenie Dehghan
(74) *Attorney, Agent, or Firm* — Calfee, Halter & Griswold LLP

(57) ABSTRACT

The automatic strand take-up installation comprises at least one gripping member (12) for taking hold of at least one strand coming from a bushing (2), the gripping member being guided by a single conveying loop (1) to the vicinity of a chopper (7). One system for maneuvering the gripping member allows the gripping member (12) to be opened and closed in such a way as to release said strand at the chopper (7).

5 Claims, 4 Drawing Sheets

(56) References Cited

U.S. PATENT DOCUMENTS

| | | | |
|---|---|---|---|
| 3,744,361 | A | 7/1973 | Van Doorn |
| 3,771,701 | A | 11/1973 | Brunk et al. |
| 3,815,461 | A | 6/1974 | Genson |
| 3,841,184 | A | 10/1974 | Thatcher |
| 3,852,141 | A | 12/1974 | Cross |
| 3,873,290 | A | 3/1975 | Marzocchi |
| 3,915,681 | A | 10/1975 | Ackley |
| 4,033,741 | A | 7/1977 | Drummond |
| 4,175,939 | A | 11/1979 | Nakazawa et al. |
| 4,210,293 | A | 7/1980 | Fromaget |
| 4,222,758 | A | 9/1980 | Stotler et al. |
| 4,347,071 | A | 8/1982 | Willis et al. |
| 4,362,260 | A | 12/1982 | Hasegawa et al. |
| 4,367,084 | A | 1/1983 | Cox et al. |
| 4,369,681 | A | 1/1983 | Van Doorn et al. |
| 4,411,180 | A | 10/1983 | Roncato |
| 4,548,106 | A | 10/1985 | Fleissner |
| 4,551,160 | A * | 11/1985 | Frailey et al. .................. 65/480 |
| 4,655,111 | A | 4/1987 | Blaker et al. |
| 4,682,523 | A | 7/1987 | Johnson et al. |
| 4,771,665 | A | 9/1988 | Van Doorn et al. |
| 5,092,207 | A | 3/1992 | Kikuchi et al. |
| 5,108,678 | A | 4/1992 | Hirasaka et al. |
| 5,398,575 | A | 3/1995 | Rewitzer |
| 5,935,289 | A | 8/1999 | Arterburn et al. |
| 5,970,837 | A | 10/1999 | Arterburn et al. |
| 6,062,048 | A | 5/2000 | Arterburn et al. |
| 6,076,442 | A | 6/2000 | Arterburn et al. |
| 6,148,640 | A | 11/2000 | Hendrickson et al. |
| 6,182,332 | B1 | 2/2001 | Jander |
| 6,202,525 | B1 | 3/2001 | Hendrickson et al. |
| 6,267,035 | B1 | 7/2001 | Bascom et al. |
| 6,415,997 | B1 | 7/2002 | Font et al. |
| 6,845,696 | B2 | 1/2005 | Font et al. |
| 2003/0000258 | A1 | 1/2003 | Font et al. |
| 2004/0172978 | A1 | 9/2004 | Bumgarner et al. |
| 2005/0066688 | A1 | 3/2005 | Eis et al. |
| 2008/0115537 | A1 | 5/2008 | Font |
| 2010/0139326 | A1 | 6/2010 | Karbowski |
| 2011/0008482 | A1 | 1/2011 | Font |

FOREIGN PATENT DOCUMENTS

| | | |
|---|---|---|
| EP | 0 849 381 | 6/1998 |
| EP | 978580 | 2/2000 |
| EP | 1910236 | 10/2011 |
| FR | 2075019 | 10/1971 |
| FR | 2126663 | 10/1972 |
| FR | 2162068 | 7/1973 |
| FR | 2204715 | 5/1974 |
| FR | 2490251 | 3/1982 |
| FR | 2804974 | 8/2001 |
| FR | 2876392 | 4/2006 |
| FR | 2916003 | 8/2009 |
| GB | 2036716 | 7/1980 |
| JP | 58-190834 | 11/1983 |
| WO | 98/01610 | 1/1998 |
| WO | 2006/008408 | 1/2006 |
| WO | 2006/037908 | 4/2006 |
| WO | 2007/010168 | 1/2007 |
| WO | 2008/141123 | 11/2008 |

OTHER PUBLICATIONS

Communication from European Application No. 06794482.7 dated Jul. 30, 2008.
Communication from European Application No. 06794482.7 dated Sep. 30, 2010.
Office action from Japanese Application No. 2008-522031 dated Mar. 27, 2012.
Office action from U.S. Appl. No. 11/576,160 dated Apr. 26, 2013.
Office action from Korean Application No. 10-2007-7007843 dated May 30, 2012.
International Search Report and Written Opinion from PCT/FR05/50497 dated Oct. 24, 2005.
International Search Report and Written Opinion from PCT/FR05/050727 dated Jan. 26, 2006.
International Search Report and Written Opinion from PCT/FR06/50728 dated Jan. 12, 2007.
International Search Report and Written Opinion from PCT/US08/063154 dated Oct. 20, 2008.
Office action from U.S. Appl. No. 10/312,849 dated Jun. 16, 2004.
Notice of Allowance from U.S. Appl. No. 10/312,849 dated Oct. 5, 2004.
Office action from U.S. Appl. No. 11/576,160 dated Sep. 7, 2010.
Notice of Allowance from U.S. Appl. No. 11/576,160 dated Feb. 2, 2011.
Office action from U.S. Appl. No. 11/630,683 dated Aug. 6, 2010.
Office action from U.S. Appl. No. 11/630,683 dated Jan. 21, 2011.
Notice of Allowance from U.S. Appl. No. 11/630,683 dated Jun. 22, 2011.
Search Report from French Application No. 656723 daetd May 20, 2005.
Communication from European Application No. 05798963.4 dated Mar. 31, 2008.
Office action from Chinese Application No. 200580021634.4 dated Jul. 24, 2009.
Communication from Chinese Application No. 200580021634.4 dated Aug. 2, 2010.
Office action from Chinese Application No. 200580021634.4 dated Sep. 2, 2010.
Office action from Chinese Application No. 200580034102.4 dated Apr. 10, 2009.
Office action from Chinese Application No. 200580034102.4 dated May 11, 2010.
Office action from Indian Application No. IN/PCT/2002/01518 dated Nov. 18, 2005.
Office action from Chinese Application No. 200880015649.3 dated Jul. 12, 2010.
Office action from Chinese Application No. 2005800341024 dated Apr. 10, 2009.
Office action from Chinese Application No. 018123961 dated Jan. 27, 2006.
Office action from Slovak Application No. PP 1823-2002 dated Apr. 25, 2006.
Search Report and Written Opinion from FR 0755025 dated Dec. 21, 2007.
Office action from Korean Application No. 10-2007-7007843 dated Dec. 31, 2012.
Office action from Korean Application No. 10-2006-7027227 dated Mar. 6, 2012 with English explanation of relevant portions of action.
Office action from Korean Application No. 10-2008-7001574 dated Oct. 16, 2012.
Notice of Allowance from U.S. Appl. No. 11/630,683 dated Jul. 20, 2012.
Office action from Mexican Application No. 2008/001000 dated Oct. 25, 2011 with English explanation of relevant portions of action.
Office action from U.S. Appl. No. 11/576,160 dated Nov. 21, 2013.

* cited by examiner

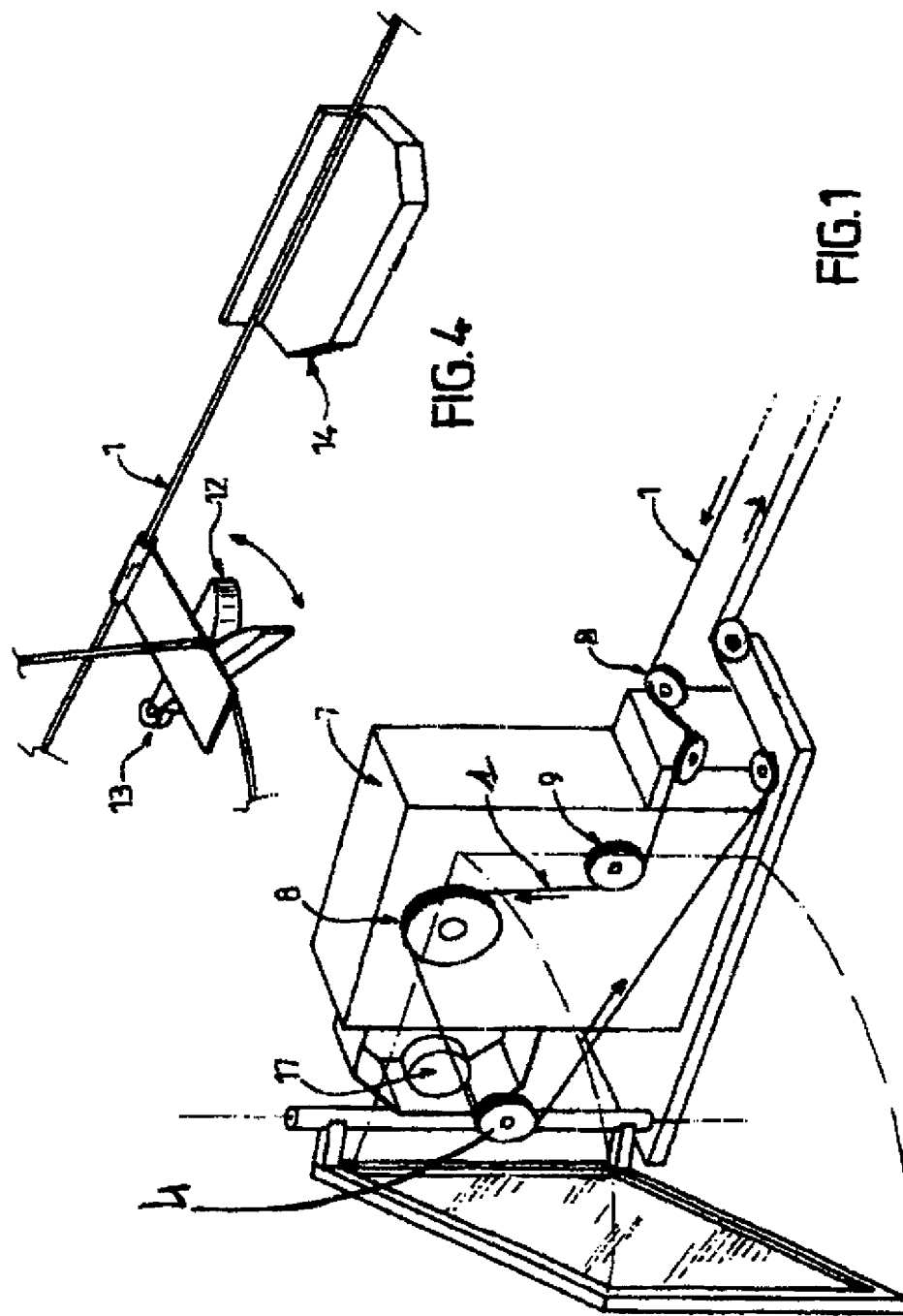

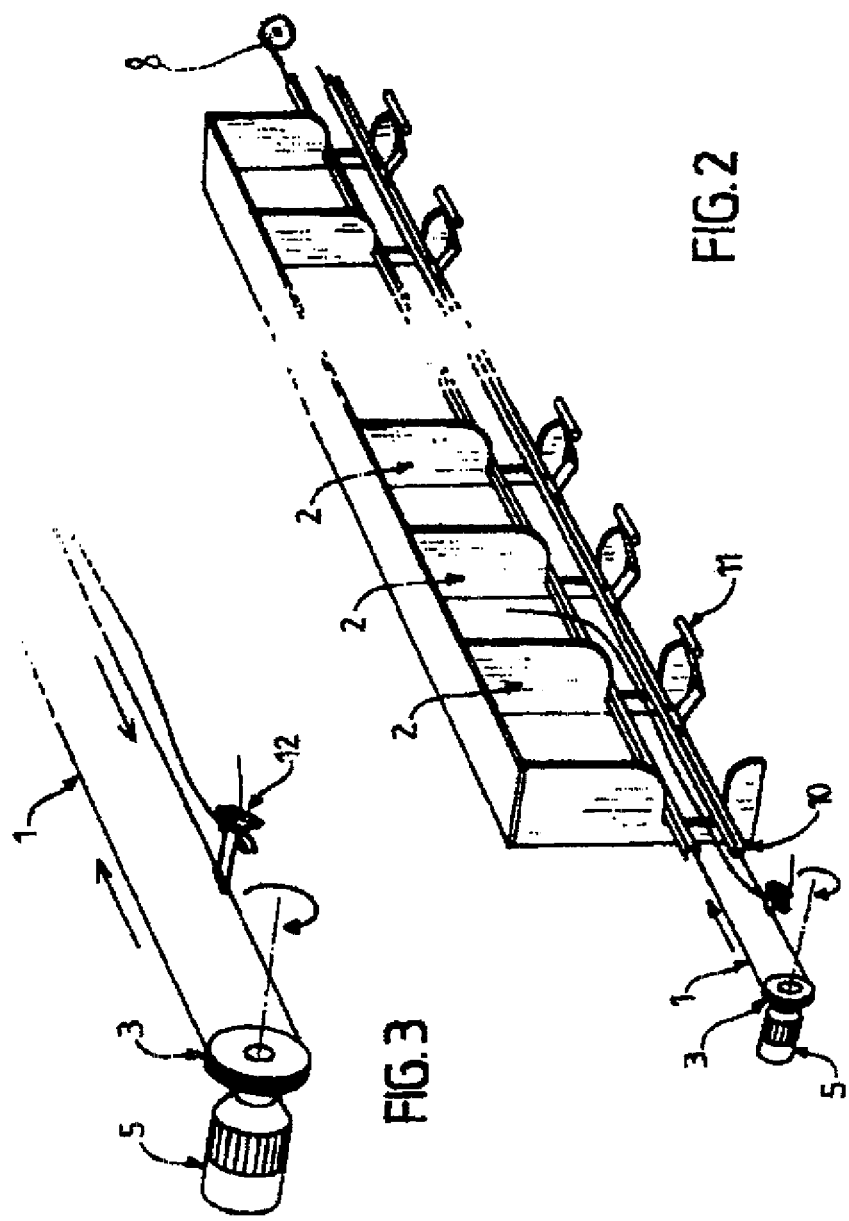

AUTOMATIC STRAND TAKE-UP INSTALLATION

BACKGROUND

The present invention relates to an automatic strand take-up installation. Even more precisely it relates to a strand take-up installation intended to be used in a below-bushing chopping process, in which process thermoplastic strands, especially glass strands, are both drawn and chopped. According to another aspect of the invention, it also relates to a process for direct chopping with a bushing equipped with this automatic strand take-up installation.

It will be recalled that the manufacture of glass reinforcement strands results from a complex industrial process that consists in obtaining strands from molten glass streams that flow out through the orifices in bushings. These streams are drawn, from at least one fiberizing cabin, into the form of continuous filaments, these filaments are then gathered into base strands, and then these strands are for example chopped continuously so as to produce a plurality of glass strands. This phase of the industrial process is commonly called "direct below-bushing chopping".

Conventionally, a fiberizing cabin essentially consists of a molten glass feed coming from a furnace, this glass at high temperature feeding a plurality of bushings made of a platinum alloy, which glass, after passing through orifices made in the bushing and being drawn, creates filaments.

In a direct below-bushing chopping process, the filaments, after having received a sizing composition and having been combined into strands, are directed to a chopper which carries out both the drawing operation and the operation of chopping the strands into chopped glass strands.

Conventionally in a below-bushing chopping process, this operation is carried out by a bushing machinist and takes place, during a normal production cycle, many times, as it is part of the technology and the operation of a below-bushing chopper.

The latter must draw the glass strands at a constant speed corresponding precisely to the steady-state output of the bushing. Now, to achieve this steady state, it is necessary to pass via a transient phase that consists essentially in progressively increasing the strand drawing speed. This transient phase is also present after any unexpected interruption to the production, such as for example when the strands break. It is necessary to pass via a transient restart phase that requires the strand to be drawn at a moderate speed, which can be obtained by hand or by an individual strand-puller placed beneath the sizing device for each bushing.

In principle, when the bushing machinist judges that the bushing is thermally stabilized, he takes hold of the strand coming from the strand-puller for this bushing and directs it onto a restart member located after the chopping members, the restart member being designed to switch the strand drawing speed from a speed of the order of a few m/s (from 1 to 5 m/s) to a few tens of m/s, which in fact corresponds to the nominal drawing speed reached in the steady state.

When this nominal speed is reached, the strands are directed onto the actual chopping member, generally consisting of an anvil wheel and a blade wheel, these being designed to output its chopped glass strands after the strands have passed between them.

Now, it will be understood that this back-and-forth movement between the bushing and the restart wheel of the chopper may take place according to programmed phases and according to non-programmed phases of the production cycle.

With regard to programmed phases, there are those that correspond to maintenance work, which requires the operation of the machine to be interrupted and the chopping member changed for example.

As regards non-programmed phases, these may especially involve work by the machinist when a breakage occurs in at least one of the strands at any point between the bushing exit and the actual chopper.

Whatever the nature of the phases, the machinist will have to move many times back and forth, which may take a not inconsiderable amount of time (especially when there are faults with several bushings). This results in a loss of final product (chopped glass strands) and the production of waste, and finally results in a reduction in efficiency of the production unit.

A direct below-bushing chopper installation for partly solving this problem is known, especially from U.S. Pat. No. 5,935,289. This installation is equipped with a mechanized device in the form of a shuttle that makes it possible, on the one hand, to take up at least one strand bundle and, on the other hand, to deposit the latter at the below-bushing chopper.

The major drawback of the above installation lies in its large size. This is because the mechanized device for taking up and depositing the strand bundle moves along a frame that faces the production installation, extending from vertically beneath the bushings as far as the actual chopper. This "curtain" arrangement constitutes a risk as regards work carried out by the bushing machinist, the safety of the latter possibly being jeopardized by the unexpected passage of the shuttle.

The present invention therefore aims to alleviate these drawbacks by proposing a sate installation that makes it possible to limit the operator's back-and-forth movements between the plurality of juxtaposed fiberizing cabins and the chopper.

SUMMARY

According to the invention, the automatic strand take-up installation intended to be used within a below-bushing chopping process, which consists in forming chopped glass strands directly from molten glass, said molten glass having passed through orifices made in at least one bushing so as to form a plurality of filaments, said filaments being combined into at least one strand, said strand being directed after a sizing operation to at least one chopper designed to chop at least one strand into a plurality of chopped glass strands of desired length, and thus following a path between the bushing and the chopper, is characterized in that it comprises:

at least one gripping member for taking hold of at least one strand, said member being able to occupy a first position in which it takes hold of the strand and a second position in which it releases the strand;

a conveying loop for moving the gripping member between a first position, in which said gripping member can take hold of at least one strand, and a second position, in which said gripping member releases said strand at the chopper.

Thanks to these arrangements and especially to the presence of a single conveying loop, it is possible to safely automate the travel of at least one strand between a bushing exit and a chopper, independently of the optimal operation of the other bushings.

In preferred embodiments of the invention, one or more of the following arrangements may optionally also be employed:

the conveying loop extends between at least two guide pulleys positioned respectively on either side of the installation, namely, on the one hand, in line with one of the cabins and, on the other hand, near the chopper and in a direction at least partially approximately perpendicular to a plane parallel to the path of the strand;

the conveying loop is set in motion at at least one of the pulleys by means of an actuator designed to make said loop move continuously at a controlled speed;

the motorized pulley is located substantially plumb with at least one of the bushings;

the installation further includes at least one control member designed to modify the state of said gripping member between the first and second positions;

the control member comprises at least one movable cam actuated by a lever, said cam being positioned in line with the strand bundle, said cam being provided with a guiding surface having an operating member fastened to said gripping member;

the gripping member can be decoupled from the conveying loop; and at least part of the conveying loop is fastened to a structure articulated to the chopper, said structure being protected by at least one cover.

According to another aspect of the invention, this also relates to a below-bushing chopping process, which consists in forming chopped glass strands directly from molten glass, said molten glass having passed through orifices made in at least one bushing so as to form a plurality of filaments, said filaments being combined into at least one strand, said strand being directed after a sizing operation to at least one chopper designed to chop at least one strand into a plurality of chopped glass strands of desired length, and thus following a path between the bushing and the chopper, characterized in that it comprises:

at least one gripping member takes hold of at least one strand, said member being able to occupy a first position in which it takes hold of the strand and a second position in which it releases the strand; and a conveying loop (1) moves the gripping member between a first position in which said gripping member takes hold of at least one strand and a second position in which said gripping member releases said strand at the chopper.

BRIEF DESCRIPTION OF THE DRAWINGS

Other features and advantages of the invention will become apparent over the course of the following description of one of its embodiments, given by way of nonlimiting example, in conjunction with the appended drawings.

In the drawings:

FIG. 1 is a perspective view on a large scale of the chopper equipped with the conveying loop shown at one of its ends;

FIG. 2 is a detailed view of the other end of the conveying loop shown in FIG. 1;

FIG. 3 is a detailed view of the conveying loop shown in FIG. 2, equipped with its gripping member according to a first alternative embodiment;

FIG. 4 is a perspective view on a large scale of the gripping member shown in FIG. 3;

DETAILED DESCRIPTION

Figure 5:
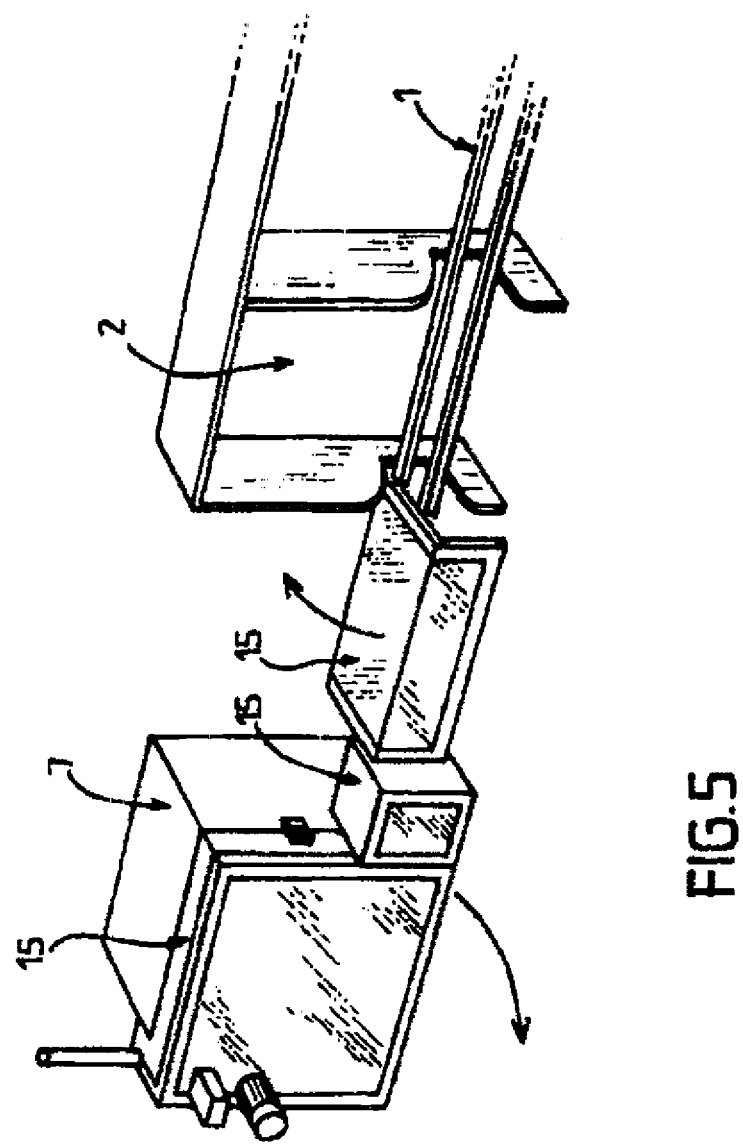
FIG. 5 is a detailed perspective view of the installation showing the protective covers.

FIGS. 1 and 2 show very schematically a production unit for implementing what is called a "direct below-bushing chopping" process. This process is well known to those skilled in the art and has formed the subject of many publications, especially EP 0 849 381 B1, and we will not describe its operation in further detail. Overall, this production unit comprises a battery of juxtaposed bushings 2, each of these bushings being capable of producing glass strands from molten glass, said molten glass having passed through orifices made in at least one of these bushings so as to form a plurality of filaments after drawing, said filaments being combined into at least one strand, said strand being directed after a sizing operation to at least one chopper, also shown in this figure, designed to chop at least one strand formed by the combining of the filaments into a plurality of chopped glass strands of desired length.

As shown in detail in FIG. 2, a conveying loop 1 is positioned vertically below the bushings 2 in a plane approximately parallel to the output of filaments coming from each of the bushings. This conveying loop 1 is established between at least two pulleys 3, 4, (shown respectively in FIGS. 3 and 1) at least one of which is motor-driven by an actuator 5, each of the pulleys being positioned respectively at either end of the battery of bushings 2 and of a chopper 7.

The actuator 5 of the hydraulic or electric motor type, makes it possible, by means of a reduction gear, to set the conveying loop 1 into permanent motion with a controlled speed, which loop 1 has an approximately linear profile at least in one zone near the bushings 2.

As can be seen in detail in FIG. 1, this conveying loop 1 extends approximately in a plane parallel to the front face of the chopper 7. This conveying loop 1 has a sinuous profile so as to follow as closely as possible the front face of the chopper 7, this sinuous profile being obtained by positioning, at suitable places, a plurality of drive and guide pulleys 8, 9 which, in the case of some of them, form an angle return.

The conveying loop 1 visible in FIGS. 3 and 4 is produced using a metal cable, a smooth or cogged belt, a chain, a ram or any other device for producing an equivalent kinematic movement, that is to say one that makes it possible for a member supported by said loop to travel without slippage between two points.

In the nonlimiting example shown in FIG. 3, the conveying loop is formed from a metal cable, especially a steel cable, tensioned between two pulleys, at least one of which is motor-operated, the profile of the pulley groove being designed to limit, or even eliminate, any slippage with the peripheral surface of the cable (an approximately conical profile of this groove is particularly suitable).

FIG. 5 shows, on a larger scale, the front face of juxtaposed bushings visible in FIG. 1. The conveying loop 1 is protected and guided inside a metal strip of U-shaped cross section, these strips being installed within a conflagration made in the lower part of the bushing so as not to impede the passage of the glass filaments.

Positioned in each bushing well is an operating member 11 in the form of a pedal or lever (visible in FIG. 2), which makes it possible to operate a cam between a first position, in which in a gripping member 12 cooperating with the conveying loop 1 can take hold of at least one glass strand, and a second position, in which this same gripping member passing near the strand cannot take hold of it, as shown in greater detail in FIG. 4.

FIG. 4 shows in detail the gripping member 12 according to a first alternative embodiment. This gripping member 12, in the form of pincers and having jaws with a curved profile so as to improve the guiding of the strands, cooperates with the conveying loop 1 either in a permanent manner (clamping or pinching) or in a nonpermanent manner, and in this case it can be decoupled therefrom. The pincers are provided with a heel that supports a cam follower 13, thereby allowing the jaws of said pincers to open or close.

This opening or closing movement of the jaws is brought about by the cam follower 13 passing over guiding surfaces made on the edge of said cam 14 according to the following kinematics:

when the cam follower 13 is in contact with the inclined guiding surface, it opens the jaws; and when there is no longer any contact between the cam follower 13 and the guiding surface of the cam 14, which is parallel to the conveying loop, the jaws close around the strand and entrain the latter owing to the translational movement of the conveying loop 1 that supports the gripping member 12.

This situation occurs only when the cam 14 is brought into position after the bushing machinist has acted on the lever 11 (as was explained above).

Figures 6, 7:
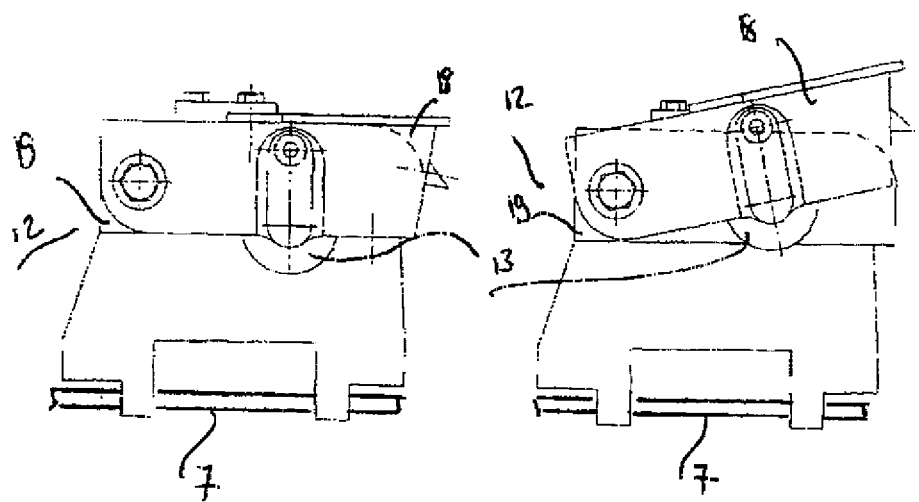
FIGS. 6 and 7 are plan views of a second alternative embodiment of the gripping member, the pincers being shown in open and closed position.

According to another embodiment of the gripping member 12 shown in FIGS. 6 and 7, this is in the form of pincers. The pincers (cf. FIG. 7) are opened by lowering a cam. This lowering movement is controlled by the bushing machinist who, after preparation of his bushing (placement of a strand bundle in the strand-puller, thermal steady state), considers that the bundle in question may be seized by the gripping member 12. For example, he presses a contactor positioned in particular facing the bushing in question, causing the cam to be lowered, which will interfere with the path of the gripping member 12.

As may be seen in FIGS. 6 and 7, the pincers comprise a fixed part 19 and a moving part 18, which is articulated to the first part. The moving part 18 has a cam follower 13 which will cross the kinematic path of the cam. Upon contact with the latter, the pincers open and the gripping member 12 fastened to the conveying loop 7 will grasp the bundle (strand). Next, under the effect of an elastic member (of the spring type or similar device), the pincers close up, clamping the bundle; the conveying loop 7 then transports the bundle to the restart wheel 17 of the chopper (which can be seen in FIG. 1), the bundle is released. The conveying loop brings the gripping member 12 into a standby position in which the pincers are cleaned, for example by a water jet, and awaits another operation by the machinist for another bushing to be restarted.

It should be noted that this operation of automatically restarting a bushing is carried out independently of the nominal operation of the other contiguous bushings. This restart operation does not interfere and hinder the production conditions of the installation.

FIG. 1 also shows the path of the conveying loop 1 at the front face of the below-bushing chopper 7. This path may be more sinuous than that formed by the first conveying loop so as to better match the profile of the chopper. Thanks to the return and guide pulleys 8, 9 being suitably positioned, it is possible to integrate this conveying loop into an existing production installation. It should also be pointed out that this conveying loop 1 (in its region located as close as possible to the chopper) is protected by a plurality of covers 15 articulated to the frame of the chopper (see FIG. 5).

According to a preferred embodiment, the conveying loop 1 is integral with a frame articulated to the frame of the chopper 7. This makes it possible to use the chopper in a conventional manner, that is to say without using the conveying loop 1.

The gripping member 12, thanks to the conveying loop, conveys the strand bundle to a restart wheel 17 of the chopper 7.

It will be recalled that the restart wheel is the member that allows the strands to be drawn during the transient operating phases of the chopper.

Specifically, when it is necessary to carry out a maintenance phase on the chopper (conventionally, a change of chopping members) or when a strand has broken as a result of a malfunction of the bushing, it is necessary to remove the strands while continuing to draw them. The restart wheel participates in this process during these transient phases, by winding the strand onto itself.

The restart wheel 17, shown in FIG. 1, is therefore provided with a device for automatically gripping the strand conveyed by the conveying loop 1 at the gripping member 12.

The restart wheel is positioned in such a way that the gripping device intercepts the path of the gripping member 12.

In the illustrative example, the restart wheel is provided with a groove. This groove, when it crosses the path of the strand, and under the effect of a rotational movement, engages the strand and winds the strand onto the peripheral surface of the restart wheel.

In the event of the gripping member not having pincers with controlled jaws, it would then be necessary to position a knife or any other similar member so that it can release the strand from the gripping member 12 before the restart wheel is set in rotational movement.

The invention as described above affords many advantages:

the conveying loop with its gripping member are positioned in regions of the production unit that are protected, thus ensuring the safety of the users; in particular, they are arranged substantially beneath the level of the floor on which the users travel, preventing them from coming into contact, at their feet, with the moving members, thereby improving safety.

this automatic strand take-up installation is compact and compatible with manual operation of the direct below-bushing chopping installation, the bushing machinist being able, in the event of a problem, to feed the chopper manually; and it does not interfere with the operation of the other bushings.

The invention claimed is:

1. A below-bushing chopping process, which consists in forming chopped glass strands directly from molten glass, said molten glass having passed through orifices made in at least one bushing so as to form a plurality of filaments, said filaments being combined into at least one glass strand, said strand being drawn and directed after a sizing operation to at least one chopper designed to chop at least one strand into a plurality of chopped glass strands of desired length, and thus following a path between the bushing and the chopper, characterized in that it comprises:

taking hold of at least one glass strand with at least one gripping member by movement of the gripping member toward the at least one chopper, said member movable between a first location in which it takes hold of said strand and a second location in which it releases said strand;

controlling movement of the gripping member from an open position to a closed position by at least one control member;

transporting the at least one gripping member by a conveying loop between the first location on the loop and a second location on the loop and remote from said first position;

and moving a lever from an engaging position in which a passing of the at least one gripping member transported by the loop is in a position to secure the at least one glass strand and a non-engaging position in which the at least one gripping member transported by loop is out of position to secure the at least one glass strand;

wherein the control member comprises at least one movable cam, said cam actuated by the lever and being positioned in line with said at least one glass strand, said cam being provided with a guiding surface, wherein said gripping member is arranged to move from a closed position to an open position upon contact with said guidance surface.

2. The process as claimed in claim 1, characterized in that the gripping member (12) takes hold of at least one glass strand at at least one bushing independently of the operation of the other bushings.

3. An automatic strand take-up installation for use within a below-bushing chopping process, the process including the steps of forming chopped glass strands directly from molten glass, the molten glass having passed through orifices made in at least one bushing so as to form a plurality of filaments, the filaments being drawn and combined into at least one glass strand, the strand being directed after a sizing operation to at least one chopper designed to chop at least one strand into a plurality of chopped glass strands of desired length, the installation comprising:

at least one gripping member, operable between an open position and a closed position, and movable from a first location in which the gripping member secures the at least one glass strand and a second location in which the gripping member releases said at least one glass strand;

a conveying loop for transporting the gripping member between the first location, and a second location remote from the first location;

at least one control member arranged to move the gripping member from the closed position to the open position; and a lever movable from an engaging position in which a passing of the at least one gripping member transported by the loop is in a position to secure the at least one glass strand and a non-engaging position in which the at least one gripping member transported by loop is out of position to secure the at least one glass strand;

wherein the control member comprises at least one movable cam, said cam actuated by the lever and being positioned in line with said at least one glass strand, said cam being provided with a guiding surface, wherein said gripping member is arranged to move from a closed position to an open position upon contact with said guidance surface.

4. The installation of claim 3, wherein said gripping member can be decoupled from said conveying loop.

5. The installation of claim 3, wherein said conveying loop is fastened to a structure articulated to the chopper, said structure being protected by at least one cover.

\* \* \* \* \*